US008565382B2

United States Patent
Tian et al.

(10) Patent No.: US 8,565,382 B2
(45) Date of Patent: Oct. 22, 2013

(54) METHOD FOR OBTAINING INFORMATION OF KEY MANAGEMENT SERVER, AND METHOD, SYSTEM AND DEVICE FOR MONITORING

(75) Inventors: Tian Tian, Shenzhen (CN); Yunwen Zhu, Shenzhen (CN); Yinxing Wei, Shenzhen (CN); Feng Gao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,063

(22) PCT Filed: Mar. 19, 2010

(86) PCT No.: PCT/CN2010/071168
§ 371 (c)(1),
(2), (4) Date: Apr. 23, 2012

(87) PCT Pub. No.: WO2010/145233
PCT Pub. Date: Dec. 23, 2010

(65) Prior Publication Data
US 2012/0207284 A1    Aug. 16, 2012

(30) Foreign Application Priority Data

Nov. 6, 2009   (CN) .......................... 2009 1 0212359

(51) Int. Cl.
*H04M 1/24*    (2006.01)
*H04M 3/08*    (2006.01)
*H04M 3/22*    (2006.01)

(52) U.S. Cl.
USPC .......................................... 379/35; 379/32.01

(58) Field of Classification Search
USPC ..................... 379/32.01, 35; 726/14; 713/190; 380/277
See application file for complete search history.

(56) References Cited

U.S. PATENT DOCUMENTS

| 6,438,695 | B1 * | 8/2002 | Maufer ........................... 726/11 |
| 8,260,258 | B1 * | 9/2012 | Li et al. ......................... 455/410 |
| 2003/0120598 | A1 | 6/2003 | Lam et al. |
| 2008/0103973 | A1 * | 5/2008 | Park et al. ....................... 705/51 |
| 2008/0148397 | A1 * | 6/2008 | Litvin et al. .................... 726/22 |
| 2009/0182668 | A1 * | 7/2009 | Lee ................................ 705/50 |

FOREIGN PATENT DOCUMENTS

| CN | 101009551 A | 8/2007 |
| CN | 101523797 A | 9/2009 |
| CN | 101572694 A | 11/2009 |

* cited by examiner

*Primary Examiner* — Quoc D Tran
(74) *Attorney, Agent, or Firm* — McClure, Qualey & Rodack, LLP

(57) ABSTRACT

The present invention discloses a method for obtaining key management server information, and an intercepting method, system and device, including: in the process of a user equipment registering an IP multimedia subsystem (IMS), storing the KMS information corresponding to the user equipment in a preset IMS core network network element; and when a lawful intercepting device monitors a session initiated by the user equipment, intercepting a session request signaling sent by the user equipment, and obtaining an identification information of the user equipment from the session request signaling, and searching the KMS information corresponding to the user equipment from the preset IMS core network network element according to the identification information of the user equipment. The technical solution of the present invention makes the requirement of lawful intercepting be met without depending on security of the signaling plane when a plurality of KMSs are deployed in the IP multimedia subsystem.

6 Claims, 3 Drawing Sheets

METHOD FOR OBTAINING INFORMATION OF KEY MANAGEMENT SERVER, AND METHOD, SYSTEM AND DEVICE FOR MONITORING

CROSS REFERENCE RELATED APPLICATIONS

This application is a national phase of PCT/CN2010/071168 filed Mar. 19, 2010, which claims priority to China Application Serial No. 200910212359.4, filed Nov. 6, 2009, both of which are entirely incorporated herein by reference.

TECHNICAL FIELD

The present invention relates to a network communication security and lawful intercepting technology, and in particular, to a method for obtaining key management server information, and an intercepting method, system and device.

BACKGROUND OF THE RELATED ART

At present, in the latest technical specification TS33.328 v1.1.0 about the media security of an IP multimedia subsystem (IMS) in 3GPP, it is proposed to use a solution based on a key management server to protect the end-to-end security of IMS media stream.

The solution in TS33.328 v1.1.0 is based on concepts of the key management server (KMS) and "ticket". The existing solution can be simply described as follows:

a calling party of a session requests a relevant key and a ticket from a KMS at first, and in this ticket, the relevant key obtained by requesting from the KMS by the calling party is contained in the ticket after being encrypted;

the calling party, after obtaining the relevant key and ticket, sends the ticket to a called party;

since the called party cannot decrypt the ticket to obtain the information contained therein, the called party continues to send the ticket to the KMS, and the KMS decrypts the ticket and returns the relevant key in the ticket to the called party;

the calling party and the called party can communicate by using the media stream encrypted by adopting the common relevant key.

However, there may be not only one KMS in a network, and when there are a plurality of KMSs, which one of the KMSs will be used by the user relates to an allocation mode of the KMSs.

The allocation mode of the KMSs has no more than two modes: one is that a user itself pre-configures one KMS but an IMS core network network element does not participate in; the other is that the IMS core network network element participates in and allocates to a user a KMS used by the user.

In the related art, an identification of the KMS is transmitted in a signaling by a plaintext, i.e., the used KMS ID by the plaintext is added into an INVITE request of initiating the session by the calling party; and after intercepting the signaling, a lawful intercepting device obtains the required key material and knows the KMS used by the user by the plaintext, and then asks the relevant key material from the corresponding KMS. It can be seen from that the solution in the related art depends on the security of a signaling plane, so the safety factor is lower.

CONTENT OF THE INVENTION

The technical problem to be solved in the present invention is to provide a method for obtaining a key management server information, and a intercepting method, system and device, so as to meet the requirement of lawful intercepting without depending on the security of the signaling plane when a plurality of KMSs are deployed in the IP multimedia subsystem.

In order to solve the problem mentioned above, the present invention discloses a method for obtaining key management server (KMS) information, comprising:

in the process of a user equipment registering an IP multimedia subsystem (IMS), storing the KMS information corresponding to the user equipment in a preset IMS core network network element; and when a lawful intercepting device monitors a session initiated by the user equipment, intercepting a session request signaling sent by the user equipment, and obtaining an identification information of the user equipment from the session request signaling, and searching the KMS information corresponding to the user equipment from the IMS core network network element according to the identification information of the user equipment.

In the above-mentioned method, the step of storing the KMS information corresponding to the user equipment in the preset IMS core network network element comprises:

when the user equipment pre-configures the KMS information, sending the pre-configured KMS information to the preset IMS core network network element by a registration message; and the preset IMS core network network element receiving the registration message, and obtaining the KMS information from the registration message and storing the KMS information.

Alternatively, the step of storing the KMS information corresponding to the user equipment in the preset IMS core network network element comprises:

when the user equipment registers to an IMS core network, the preset IMS core network network element allocating to the user equipment a KMS corresponding to the user equipment, and storing the KMS information of the KMS in the preset IMS core network network element.

Wherein the preset IMS core network network element is one or more of the following:

a service-call session control functional entity (S-CSCF), a proxy service-call session control functional entity (P-CSCF) and a home subscriber server (HSS).

In the above-mentioned method, after the lawful intercepting device finds the KMS information corresponding to the user equipment, the lawful intercepting device asks from the KMS the key material of the session to be monitored, generating a session key, and performing a session monitoring.

The present invention also discloses an intercepting system, which comprises an IP multimedia subsystem (IMS) core network network element and a lawful intercepting device, wherein:

the IMS core network network element is configured to, in the process of a user equipment performing an IMS registration, store a KMS information corresponding to the user equipment; and the lawful intercepting device is configured to intercept a session request signaling sent by the user equipment, obtain an identification information of the user equipment initiating a session from the session request signaling, and search the KMS information corresponding to the user equipment from the IMS core network network element according to the identification information of the user equipment.

In the above-mentioned system, the IMS core network network element is further configured to receive a registration message sent by the user equipment, and obtain the KMS information pre-configured by the user from the registration message and store.

Wherein the IMS core network network element is further configured to, when the user equipment performs the IMS user registration, allocate a corresponding KMS to the user equipment, and store the KMS information of the KMS.

The IMS core network network element is one or more of the following: a service-call session control functional entity (S-CSCF), a proxy service-call session control functional entity (P-CSCF) and a home subscriber server (HSS).

In the above-mentioned system, the lawful intercepting device is further configured to ask from the KMS the key material of the session to be monitored, generate a session key, and perform a session monitoring.

The present invention also discloses an intercepting method, which comprises:

a lawful intercepting device obtaining a key management server (KMS) information corresponding to a session to be monitored, asking from the KMS the key material of the session to be monitored, generating a session key, and performing a session monitoring.

In the above-mentioned method, the step of the lawful intercepting device obtaining the KMS information corresponding to the session to be monitored comprises:

the lawful intercepting device intercepting a session request signaling sent by a calling party of the session to be monitored, obtaining an identification of the calling party from the session request signaling, and according to the identification of the calling party, obtaining the KMS information corresponding to the session to be monitored from a preset IMS core network network element stored the session calling party and the KMS information of the calling party.

The present invention also discloses an intercepting device, which comprises an information obtaining module and a processing module, wherein:

the information obtaining module is configured to obtain a key management server information; and the processing module is configured to, according to the key management server information in the information obtaining module, obtain the key material of a session to be monitored from the key management server, generate a session key, and perform a session monitoring.

Wherein the information obtaining module is further configured to only obtain an identification of a calling party from an intercepted session request signaling, and according to the identification of the calling party, obtain the KMS information corresponding to the session to be monitored from a preset IMS core network network element stored the session calling party and the KMS information of the calling party.

The corresponding IMS registration flow is modified in the technical solution of the present invention regarding to two KMS allocation information cases of presetting by the user and allocating by the network, the user and its corresponding KMS information are stored in the corresponding IMS core network network element, which enables the lawful intercepting point to acquire the corresponding KMS from the IMS corresponding network element by the intercepted signaling message, thereby avoiding that the user viciously tampers the KMS ID or the signaling message, and ensuring that the lawful intercepting device finds the correct KMS to perform the lawful intercepting.

PREFERRED EMBODIMENTS OF THE PRESENT INVENTION

The main design of the present invention is that, regarding to two scenes of user presetting KMS information and network allocating KMS information in the related art, an IMS registration flow can be modified, such that a user equipment and its corresponding KMS information are stored in a corresponding IMS core network network element, while a lawful intercepting device obtains the user equipment information by an intercepted signaling message, knows the corresponding KMS information from the IMS corresponding network element according to the user equipment information, then obtains the corresponding encrypted material from the corresponding KMS and generates a key, and finally is able to monitor an encrypted communication of the users.

The technical solution of the present invention will be further illustrated in detail in combination with the accompanying drawings and the specific embodiments.

Figure 1:
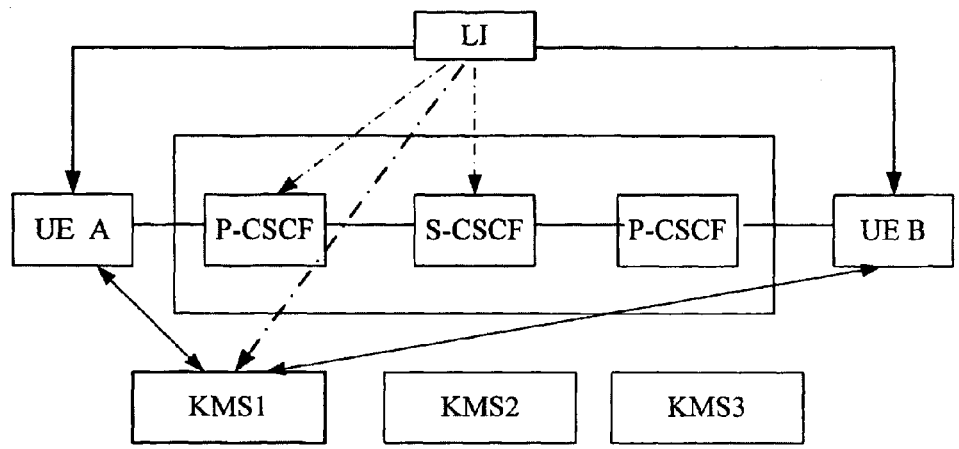
FIG. 1 is an architecture diagram of an intercepting system provided in the present invention.

As shown in FIG. 1, an embodiment of an intercepting system according to the technical solution of the present invention comprises an IMS core network network element, two IMS users of UE A and UE B (UE A is a calling party, and UE B is a called party), a lawful intercepting devices LI, KMS1, KMS2 and KMS3, wherein KMS1, KMS2 and KMS3 are believable key management servers in the network respectively.

The UE A and the UE B are used for performing the IMS user registration and performing a session;

the IMS core network network element is used for storing the user equipment and its corresponding KMS information (such as KMS ID) in the process of the user equipment (such as the UE A and the UE B) performing the IMS user registration;

a lawful intercepting equipment is used for intercepting a session request signaling sent by the calling party by an access point in the IMS core network, and obtaining an identification of the calling party (i.e., UE A ID) by the intercepted session request signaling, then according to the identification of the calling party, searching the KMS ID corresponding to the calling party in the IMS core network network element, such as S-CSCF (Service-Call Session Control Function), asking the key material used by the session between the users A and B from the corresponding KMS, generating a key, and then performing the lawful intercepting.

The process of the lawful intercepting device obtaining the key management server information in the above-mentioned system will be introduced in combination with various application scenes below.

Embodiment 1

The present embodiment is suitable for pre-configuring the KMS information by a user or pre-obtaining the KMS information from other mechanisms, without the scene of the IMS core network network element participating in the KMS allocation.

Figure 2:
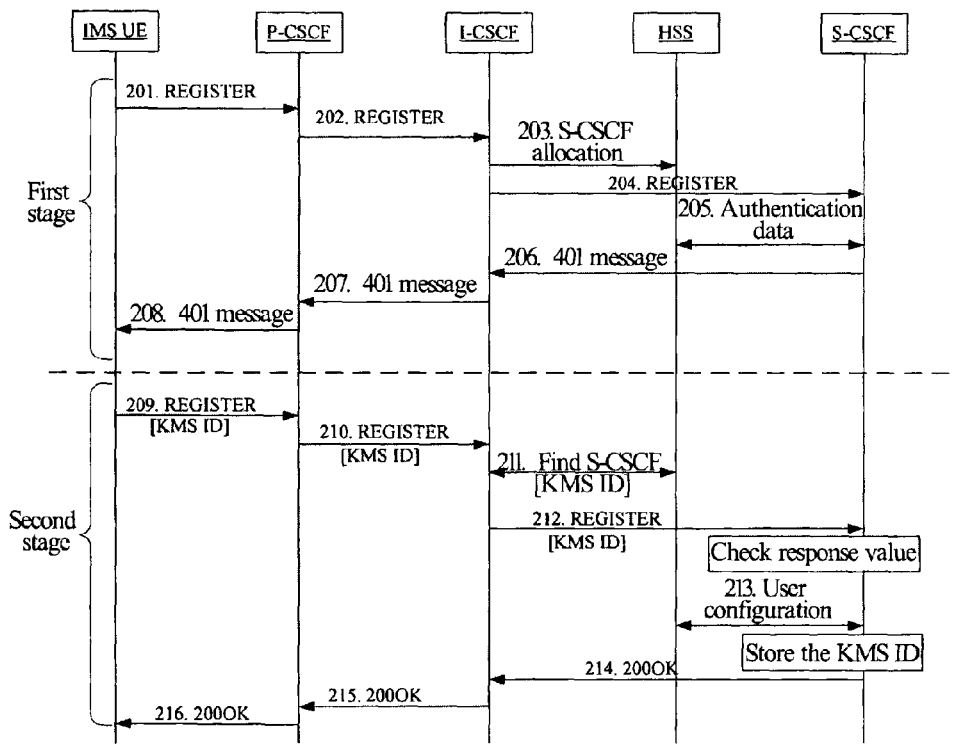
FIG. 2 is a flow chart of an IMS user registration in embodiment 1.

In this scene, the process of the IMS user registration, as shown in FIG. 2, comprises the following steps:

in step 201, the UE sends an SIP REGISTER (registration) request to a P-CSCF (proxy service-call session control functional entity), wherein the request contains an identification of the UE to be registered and a name of a home domain, i.e., an I-CSCF (interrogating service-call session control functional entity) address;

in step 202, the P-CSCF receives and processes the registration request, and analyzes the IP address of the I-CSCF by using the provided name of the home domain;

in step 203, the I-CSCF contacts a home subscriber server (HSS), such that the required S-CSCF ability requirement is obtained for a selection process of the S-CSCF;

in step 204, the I-CSCF forwards the registration request to the selected S-CSCF after the S-CSCF is selected;

in step 205, because the S-CSCF discovers that the UE is not authorized, the S-CSCF asks certification data from the HSS;

in step 206, the S-CSCF renders demurral to the registration of the user by a 401 message, unauthorized response;

in steps 207 to 208, the IMS network forwards the above 401 message to the UE;

in step 209, the UE receives the above 401 message, calculates a response value of the demurral proposed by the 401 message, and sends another registration request to the P-CSCF again, wherein that registration request carries the calculated response value and a pre-configured KMS ID;

in steps 210 to 212, the P-CSCF forwards the registration request carrying the response value and the KMS ID to the corresponding S-CSCF through the I-CSCF;

in step 213, the S-CSCF receives the above registration request. checks the response value therein, and when the S-CSCF checks that the response value is correct, downloads the user configuration of the UE from the HSS, and meanwhile stores the KMS ID carried in the registration request; and in steps 214 to 216, the P-CSCF accepts the registration request through a 2000K response.

In this way, when the lawful intercepting device needs to monitor the session, the lawful intercepting device intercepts the session request signaling sent by the calling party to obtain the calling party information from the session request signaling, then knows the corresponding KMS information from the IMS corresponding network element according to the calling party information, asks the corresponding encrypted material from the corresponding KMS to generate the key, and finally monitors the encrypted communication of users.

In a practical configuration, it can be also selected that the KMS ID is stored in the P-CSCF or the HSS or a plurality of IMS core network network elements according to the specific condition of operator's equipment. In a preferable solution, the KMS ID is stored in the S-CSCF and/or the HSS.

Embodiment 2

The present embodiment is suitable for a scene in which the IMS core network network element participates in the KMS allocation, in the scene if the user has pre-configured the KMS ID, the KMS ID allocated by the IMS core network network element can cover the KMS ID pre-configured by the user.

Figure 3:
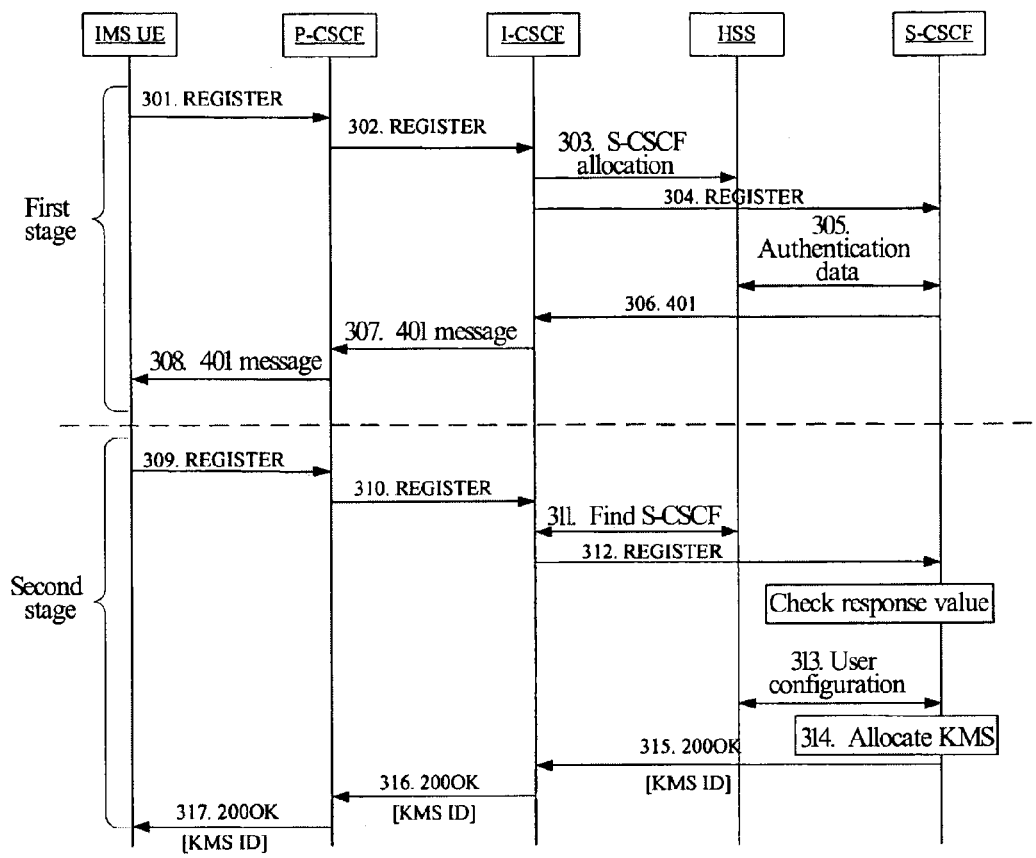
FIG. 3 is a flow chart of an IMS user registration in embodiment 2.

The process of the IMS user registration in the present embodiment is shown in FIG. 3, the difference between the process of the IMS user registration of the present embodiment and that of the embodiment 2 is only step 309 to step 312. the IMS user can carry the KMS ID information pre-configured by the user in the REGISTER message or cannot carry any KMS-related information; while in step 314, the core network network element allocates a KMS to the user and sends the allocated KMS ID to the IMS user by 2000K message, and at the same time the IMS core network network element stores the user and its corresponding KMS ID. In this way, when the lawful intercepting device needs to monitor the session, the lawful intercepting device intercepts the session request signaling sent by the calling party to obtain the calling party information from the session request signaling, then knows the corresponding KMS information from the IMS corresponding network element according to the calling party information, asks the corresponding encrypted material from the corresponding KMS to generate the key, and finally monitors the encrypted communication of users.

In the present embodiment, the S-CSCF performs the KMS allocation to the user, and in the practical deployment, the function implementation of the KMS allocation can also be put in other IMS core network network elements, such as HSS, etc., according to the particular condition of operator's equipment.

Embodiment 3

The present embodiment is suitable for a scene in which an IMS user (UE A) pre-configures a KMS1 as the used KMS.

Figure 4:
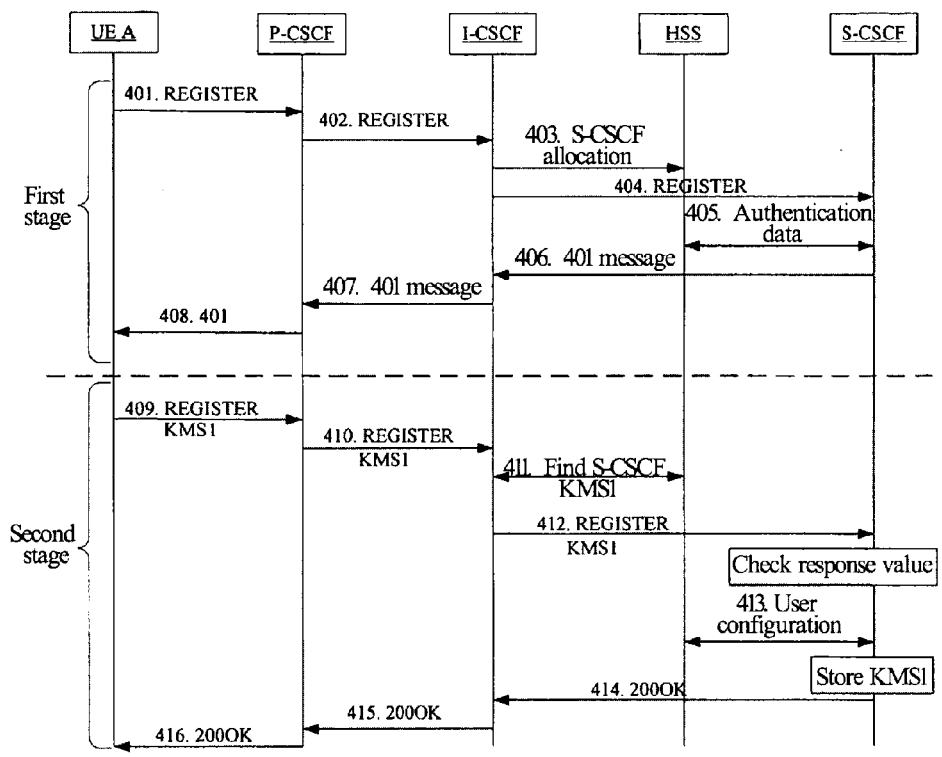
FIG. 4 is a flow chart of an IMS user registration in embodiment 3.

The process of the UE A performing the IMS user registration is shown in FIG. 4, the difference between the process of the UE A performing the IMS user registration of the present embodiment and that of the embodiment 1 is in that, in step 409 when the UE A sends the REGISTER information to the corresponding IMS core network network element in the IMS core network, the pre-configured KMS1 is carried in the REGISTER information, and after the IMS core network network element S-CSCF receives the KMS1 carried in the REGISTER information, the S-CSCF stores the binding information about the UE and its corresponding KMS ID. After that, when the UE A initiates a session, the lawful intercepting device can intercept a session request signaling sent by the UE A, obtains the information of the UE A from the session request signaling, and then knows the corresponding KMS information from the IMS corresponding network element according to the information of the UE A, then asks the corresponding encrypted material from the corresponding KMS to generate a key, and finally is able to monitor the encrypted communication of users.

Figure 5:
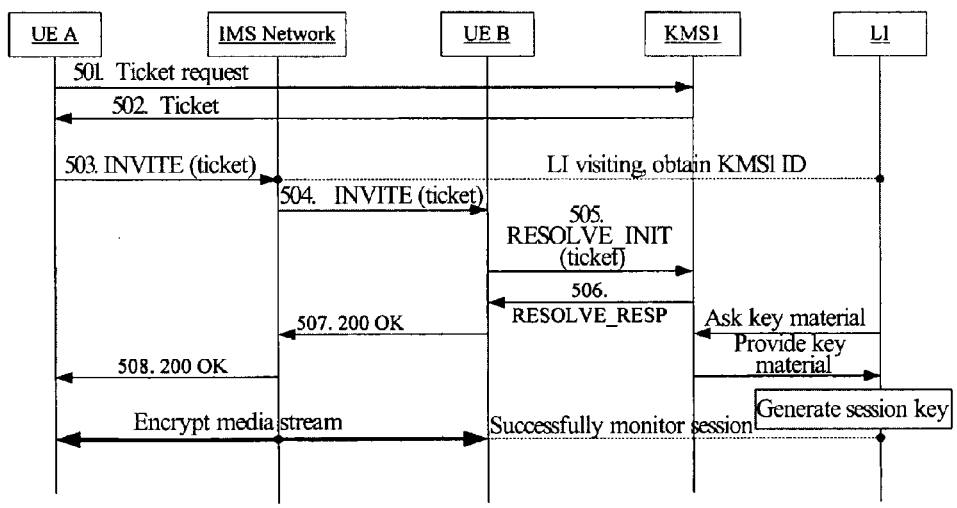
FIG. 5 is a flow chart of a session initiated by an IMS user in embodiment 3.

Specifically, the process of the UE A initiating the session, as shown in FIG. 5, comprises the following steps:

in step 501, the UE A sends out a ticket request to the KMS1 at first;

in step 502, the KMS1 provides a ticket to the UE A;

in step 503, the UE A sends out an INVITE message, wherein the ticket and other parameters are contained in the message;

in which, other parameters can be seen MIKEY-TICKET specifically.

In step 504, the IMS core network forwards the INVITE message to the called user, i.e., UE B;

in step 505, because the UE B cannot decrypt the ticket, the UE B continues to send the ticket to the KMS1 to make the KMS1 decrypt the ticket;

in step 506, the KMS1 validates the user, then decrypts the ticket and returns the relevant key therein to the UE B;

in steps 507-508, the response is successful, the called party UE B returns the 2000K message to the UE A via the IMS network, and then the UE A and UE B can communicate using the media stream encrypted by adopting the common relevant key.

Meanwhile, the lawful intercepting device can intercept the INVITE message sent by the UE A, obtain the ID of the UE A from the INVITE message, then obtains the KMS ID, i.e., KMS1, corresponding to the UE A from the corresponding IMS core network network element according to the ID of the UE A, and then the LI asks the related key material from the KMS1, generates the session key of the UEs A and B to monitor the encrypted communication of the UEs A and B.

A lawful intercepting device provided in the present invention will be further introduced below, and the intercepting device comprises an information obtaining module and a processing module.

The information obtaining module is used for obtaining the key management server information;

in which, the information obtaining module can intercept the session request information sent by the UE initiated the session according to the related art, and obtain the key management server information (i.e., KMS ID) from the session request information; or the information obtaining module can, according to the operation of the lawful intercepting device in the above-mentioned intercepting system, obtain the calling party identification (i.e., ID of the UE initiating the session) through the intercepted session request signaling, then, according to the calling party identification, searches the key management server information (i.e., KMS ID) corresponding to the calling party from the IMS core network network element, such as S-CSCF.

The processing module is used for, according to the key management server information in the information obtaining module, obtaining all the key material of the session to be monitored in the key management server, generating a key, and then performing the monitoring.

The process of the above lawful intercepting device realizing the lawful intercepting comprises the following steps:

in step A, the lawful intercepting device obtains the KMS ID corresponding to the session to be monitored;

in the step, the lawful intercepting device can obtain the KMS ID corresponding to the session to be monitored according to the related art; the lawful intercepting device also can intercept the session request signaling sent by the session initiator, and obtain the identification of the session initiator from the session request signaling, and searches for the corresponding KMS ID in the preset IMS core network network element according to the identification of the session initiator.

In step B, the lawful intercepting device obtains all the key material of the session to be monitored from the obtained KMS, generates a key, and finally performing the monitoring.

It can be seen from the above embodiments that, the technical solution of the present invention proposes modifications for the user registration flow at the IMS network when corresponding to different KMS configuration solutions, thereby perfecting the related art, and no longer depending on the protection of the signaling plane when having the session.

The present invention can have a plurality of other embodiments, which are also suitable for the case of having only one KMS in the network. Without departing from the spirit and nature of the present invention, various corresponding changes and variations can be made by those skilled in the art according to the present invention, and these corresponding changes and variations should belong to the protection scope of the appending claims of the present invention.

Industrial Applicability

The corresponding IMS registration flow is modified in the technical solution of the present invention regarding to two KMS allocation information cases of presetting by the user and allocating by the network, the user and its corresponding KMS information are stored in the corresponding IMS core network network element, which enables the lawful intercepting point to acquire the corresponding KMS from the IMS corresponding network element by the intercepted signaling message, thereby avoiding that the user viciously tampers the KMS ID or the signaling message, ensuring that the lawful intercepting device finds the correct KMS to perform the lawful intercepting, and perfecting the related art, and no longer depending on the protection of the signaling plane when having the session.

What we claimed is:

1. A method for obtaining key management server (KMS) information, comprising:

in the process of a user equipment registering an IP multimedia subsystem (IMS), storing the KMS information corresponding to the user equipment in a preset IMS core network network element; and when a lawful intercepting device monitors a session initiated by the user equipment, intercepting a session request signaling sent by the user equipment, and obtaining an identification information of the user equipment from the session request signaling, and searching the KMS information corresponding to the user equipment from the preset IMS core network network element according to the identification information of the user equipment;

wherein the step of storing the KMS information corresponding to the user equipment in the preset IMS core network network element comprises:

when the user equipment pre-configures the KMS information, sending the pre-configured KMS information to the preset IMS core network network element by a registration message; and the preset IMS core network network element receiving the registration message, and obtaining the KMS information from the registration message and storing the KMS information; or when the user equipment registers to an IMS core network, the preset IMS core network network element allocating to the user equipment a KMS corresponding to the user equipment, and storing the KMS information of the allocated KMS in the preset IMS core network network element.

2. The method as claimed in claim 1, wherein, the preset IMS core network network element is one or more of the following:

a service-call session control functional entity (S-CSCF), a proxy service-call session control functional entity (P-CSCF) and a home subscriber server (HSS).

3. The method as claimed in claim 1, wherein, after the step of the lawful intercepting device finding the KMS information corresponding to the user equipment, the method further comprises:

the lawful intercepting device asking from the KMS the key material of the session to be monitored, generating a session key, and performing a session monitoring.

4. An intercepting system, comprising an IP multimedia subsystem (IMS) core network network element and a lawful intercepting device, wherein:

the IMS core network network element is configured to, in the process of a user equipment performing an IMS registration, store a key management server (KMS) information corresponding to the user equipment; and the lawful intercepting device is configured to intercept a session request signaling sent by the user equipment, obtain an identification information of the user equipment from the session request signaling, and search the KMS information corresponding to the user equipment from the IMS core network network element according to the identification information of the user equipment;

wherein the IMS core network network element is further configured to receive a registration message sent by the user equipment, and obtain the KMS information preconfigured by the user from the registration message and store; or is further configured to, when the user equipment performs the IMS user registration, allocate a corresponding KMS to the user equipment, and store the KMS information of the KMS.

5. The system as claimed in claim 4 wherein,
the IMS core network network element is one or more of the following:
a service-call session control functional entity (S-CSCF), a proxy service-call session control functional entity (P-CSCF) and a home subscriber server (HSS).

6. The system as claimed in claim 4, wherein,
the lawful intercepting device is further configured to ask from the KMS the key material of the session to be monitored, generate a session key, and perform a session monitoring.

* * * * *